United States Patent [19]

Muller et al.

[11] Patent Number: 4,761,696
[45] Date of Patent: Aug. 2, 1988

[54] HELICAL SCAN TYPE APPARATUS WITH READILY ALIGNED SCANNING UNIT

[75] Inventors: Johannes C. A. Muller; Cornelis M. Beijersbergen Van Henegouwen, both of Eindhoven, Netherlands

[73] Assignee: U.S. Philips Corporation, New York, N.Y.

[21] Appl. No.: 880,856

[22] Filed: Jul. 1, 1986

[30] Foreign Application Priority Data

Feb. 21, 1986 [NL] Netherlands ............... 8600438
Mar. 28, 1986 [NL] Netherlands ............... 8600814

[51] Int. Cl.$^4$ .................. G11B 5/08; G11B 21/04
[52] U.S. Cl. .................. 360/84; 360/130.22; 360/130.23; 360/130.24
[58] Field of Search .......... 360/84, 107, 130.22, 360/130.23, 130.24

[56] References Cited

U.S. PATENT DOCUMENTS 3,435,154 3/1969 Kihara .................. 360/84 X
3,955,215 5/1976 Hosoi .................... 360/84 X
4,641,214 2/1987 Imanishi et al. .......... 360/84 X

OTHER PUBLICATIONS

"Procedures in Experimental Physics", by Stroug, 1945, pp. 585–593, Prentice-Hall.

Primary Examiner—John H. Wolff
Attorney, Agent, or Firm—David R. Treacy

[57] ABSTRACT

A helical scan head drum assembly includes upper and lower drums having an aligned guide surface. The upper and lower drums can be easily separated from each other to install or replace a head support between the drums, and reassembled without loss of alignment of the circumferential guide surface. Each drum has three positioning elements formed in a wall portion, arranged such that the positioning elements of the two drums engage each other pairwise to form a statically defined alignment of the two drums. The fixing element presses the two drums together at the location of the positioning elements to fix them in place.

8 Claims, 3 Drawing Sheets

HELICAL SCAN TYPE APPARATUS WITH READILY ALIGNED SCANNING UNIT

The invention relates to a magnetic-tape apparatus comprising a scanning unit mounted on a frame and comprising at least one magnetic head mounted on a rotatable head support, a drum-shaped guide means comprising an upper drum and a lower drum which each occupy a fixed position on the frame and between which the head support is mounted for rotation, the circumferential outer surfaces of the drums together forming a curved guide surface situated near the circular path of the magnetic head, for guiding a magnetic tape wrapped around and transported over the guide surface, fixing means which interconnect the upper drum and the lower drum, and positioning elements which position the upper drum and the lower drum relative to one another.

A magnetic-tape apparatus of this type is known from U.S. Pat. No. 3,435,154. In such an apparatus the tape is guided along a helical path over the guide surface formed by the circumferential outer surfaces of stationary upper and lower drums, so that during operation tracks which are inclined relative to the longitudinal axis of the magnetic tape are written onto or read from the tape by the magnetic head.

In order to interconnect the upper drum and the lower drum the known apparatus employs a bridging member on that side of the upper and lower drum which is remote from the guide surface. This member interconnects the lower and upper drum by means of bolts. In view of the accuracy with which the inclined tracks should be read or written during operation, it is desirable that the connection between the upper drum and the lower drum is such that the two drums are positioned correctly relative to one another. For this purpose the bridging member employs two locating pins which extend in axial directions relative to the axis of rotation of the head support, the upper and the lower drums each being slid against the locating pins during assembly and being subsequently secured.

It is important that the bridging member and the two location pins which are employed for this purpose are manufactured with a high accuracy. Despite this accuracy the positioning of the upper and the lower drums relative to each other may exhibit deviations resulting from at least two causes. The first cause is the result of tolerances on the diameter of the lower and upper drum, which may permit the diameters of the upper drum and the lower drum not to be exactly identical. After assembly of the scanning unit such tolerances may result in a kind of "step" effect.

The second cause of inaccurate alignment of the drums resides in the bridging member which is employed. This is because it is substantially impossible to form the bridging member with bores for the locating pins in such a way that the central axis of each bore extends perfectly perpendicularly to the axial end walls of the upper drum and the lower drum. In practice, this generally results in each locating pin fitted in the bridging member not extending perpendicularly to these axial end walls. During disassembly of the scanning unit, for example, in order to replace the head support, these deviations give rise to the upper and the lower drum being positioned differently after re-assembly.

SUMMARY OF THE INVENTION

It is an object of the invention to provide a magnetic-tape apparatus of the type defined in the opening paragraph, in which the scanning unit does not employ a bridging member and comprises an upper and a lower drum whose guide surface is positioned correctly, the correct relative positioning being readily maintained after disassembly and subsequent re-assembly.

To this end the invention is characterized in that the upper and lower drums have facing axial end walls having wall portions which each carry three positioning elements, the positioning elements on one wall portion relatively engaging those on the other wall portion pairwise to establish together a statically defined connection predetermined alignment between the upper and the lower drum, and the fixing means keep the positioning elements pressed pairwise against one another.

In this way the upper and lower drum can be connected to each other without the use of a bridging member. The three-point connection by means of the positioning elements, which is entirely statically defined, results in an accurate positioning of the upper and lower drum relative to one another. Further, the two drums can be disassembled and re-assembled simply, so that the accurate positioning of the two drums is maintained, for example after replacement of the head support and the magnetic head or magnetic heads mounted on this support. The only residual tolerance in the scanning unit resides in the head protrusion of the magnetic head or heads on the head support. The correct positioning of the upper and the lower drum relative to each other ensures that the guide surfaces on the two drums are aligned, so that there is no "step" caused by differences in drum assembly. This alignment guarantees a constant thickness of the air film formed between the guide surface and the magnetic tape at the location of the upper and the lower drum. This enables a very good air-film guidance of the tape at the location of the guide surface of the drums to be obtained, which is advantageous for a correct and uniform tape transport.

A preferred embodiment of the invention is characterized in that the wall portions are sectors of the axial end walls of the upper and the lower drum. Thus, the positioning elements on the axial end walls are suitable in order to obtain a statically defined positioning of the upper and lower drum relative to each other.

U.S. Pat. No. 3,435,154 further describes a scanning unit in which the guide surface has a circularly cylindrical shape with a cylinder axis which at least substantially coincides with the axis of rotation of the head support. In this respect a preferred embodiment of the invention is characterized in that, viewed parallel to the axis of rotation, in an area outside the guide surface, the drums extend radially beyond the circular path described by the free end of the magnetic head, and the positioning elements are arranged on the wall portions in the area outside the circular path. Since these wall portions are outside the circular path of the magnetic head, after assembly the positioning elements do not obstruct the rotation of the head support and the magnetic head on this support.

In the preferred embodiment the positioning elements are integral with the associated upper and lower drums respectively. By forming the positioning elements integrally with the upper and the lower drums the positioning elements can be manufactured simultaneously with the drums. This means that providing the positioning elements is cheaper and proceeds more rapidly than providing these elements in a separate operation after the manufacture of the drums.

Preferably the positioning elements are formed as recesses in and protrusions on the wall portion present on the axial end walls of the upper and the lower drum respectively. In this way a three-point, entirely statically defined connection between the upper and the lower drum can be obtained in a simple manner.

In this preferred embodiment the fixing means are arranged near the wall portions in the area outside said circular path. In this way the wall portions can be connected to each other without the fixing means obstructing the rotation of the head support and the magnetic head carried by this support.

The fixing means properly secures the upper drum and the lower drum relative to each other by means of only one bolt connection. This connection, viewed parallel to the axis of rotation, extends at least substantially diametrically relative to the center of the guide surface and within a triangle whose vertices are defined by the positioning elements. This provides a simple, symmetrical construction, and ensures that the positioning elements correctly engage with each other and the upper drum and the lower drum are accurately positioned relative to one another.

The invention also relates to a method of manufacturing the scanning unit of a magnetic-tape apparatus in accordance with the invention. This method is characterized by the following sequence of operations:

the upper drum and the lower drum are manufactured separately, but without formation of the guide surface portions, the positioning elements being formed during this manufacture, the upper drum and the lower drum are assembled, positioned relative to each other by means of the positioning elements, and clamped together, the assembled upper and lower drum are together machined, at least locally at their circumferential surfaces at least locally, to form the guide surface, the upper drum and the lower drum are separated from each other and the head support and the associated drive means are mounted, and then the upper drum and the lower drum are re-assembled, positioned relative to each other by means of the positioning elements, and secured with the aid of the fixing means.

Thus, after their manufacture the lower drum and the upper drum may initially have different radii with a comparatively large tolerance. After assembly the circumferential surfaces of the two drums together are machined at least locally, suitably by turning off, so that the resulting guide surface has a radius which is exactly the same for the upper drum and the lower drum. The presence of the positioning elements ensures that after separation of the two drums, mounting of the head support and the associated drive means, re-assembly of the two drums and interconnection with the aid of the fixing means, the portions of the guide surface situated on the upper drum and the lower drum are positioned very accurately relative to each other. Furthermore, it is advantageous in the manufacture of the lower and the upper drum that the positioning elements themselves need not comply with specific accuracy requirements. It is only important that in the assembled condition of the lower drum and the upper drum a uniquely defined scanning unit assembly is obtained. Thus, the present method enables a scanning unit to be manufactured cheaply and rapidly with an accurate positioning of the guide surfaces on both drums.

In this respect a further method is characterized in that during the joint machining of the upper and the lower drum the tool used for this purpose is controlled both in the radial and in the axial direction. The use of a tool, preferably a cutting tool which is controlled both in the radial and in the axial direction during turning off, has the advantage that other parts on the drums can also be formed when the drums are being turned off. In this respect it is important that the cutting tool be controlled in such a way that the wall portions carrying the positioning elements and the fixing means on the facing axial end surfaces of the upper and the lower drum are effectively cleared by the cutting tool at the location of the positioning elements and the fixing means. Thus, in the sector where said elements and means are situated these wall portions retain their original shape as obtained after their manufacture.

In another aspect of the method, during the tool's controlled movement in the axial direction the tool forms a guide face on one of the drums for guiding a lateral edge of the magnetic tape. Such a guide face supports one edge of the magnetic tape in a direction perpendicular to the longitudinal axis of the tape during the movement over the guide surface. In this way this guide face can also be formed accurately on the scanning unit, so that the height position of the magnetic tape on the scanning unit during the movement over the guide surface is defined accurately.

With respect to the foregoing another method is characterized in that by the controlled movement in the axial and the radial direction at least one tape guide is formed at the same time. By simultaneously forming the tape guide this tape guide need not be formed separately and is positioned accurately relative to both drums. Thus, all the guide means for the magnetic tape in the apparatus which should be positioned accurately are integrated in the scanning unit. When relative to the tape-transport direction over the guide surface further tape guides are arranged near both ends of the guide surface, the tape can leave the scanning unit at a level relative to a reference face, such as the upper side of the deck plate, which at least substantially corresponds to the level at which the tape enters the scanning unit. This is a significant advantage because this enables the other tape guides of the magnetic-tape apparatus with their portions which guide the lower tape edge to be situated at the same level relative to said reference face, so that these other tape guides can be mounted in a simple manner. Thus, in a situation in which the magnetic tape is wound on reels which are spaced equidistantly from said reference face, the transport of the tape out of the cassette accommodating the reels can be effected simply in the magnetic-tape apparatus in accordance with the invention.

The invention will be described in more detail, by way of example, with reference to the accompanying drawing.

DESCRIPTION OF THE PREFERRED EMBODIMENTS

Figure 1:
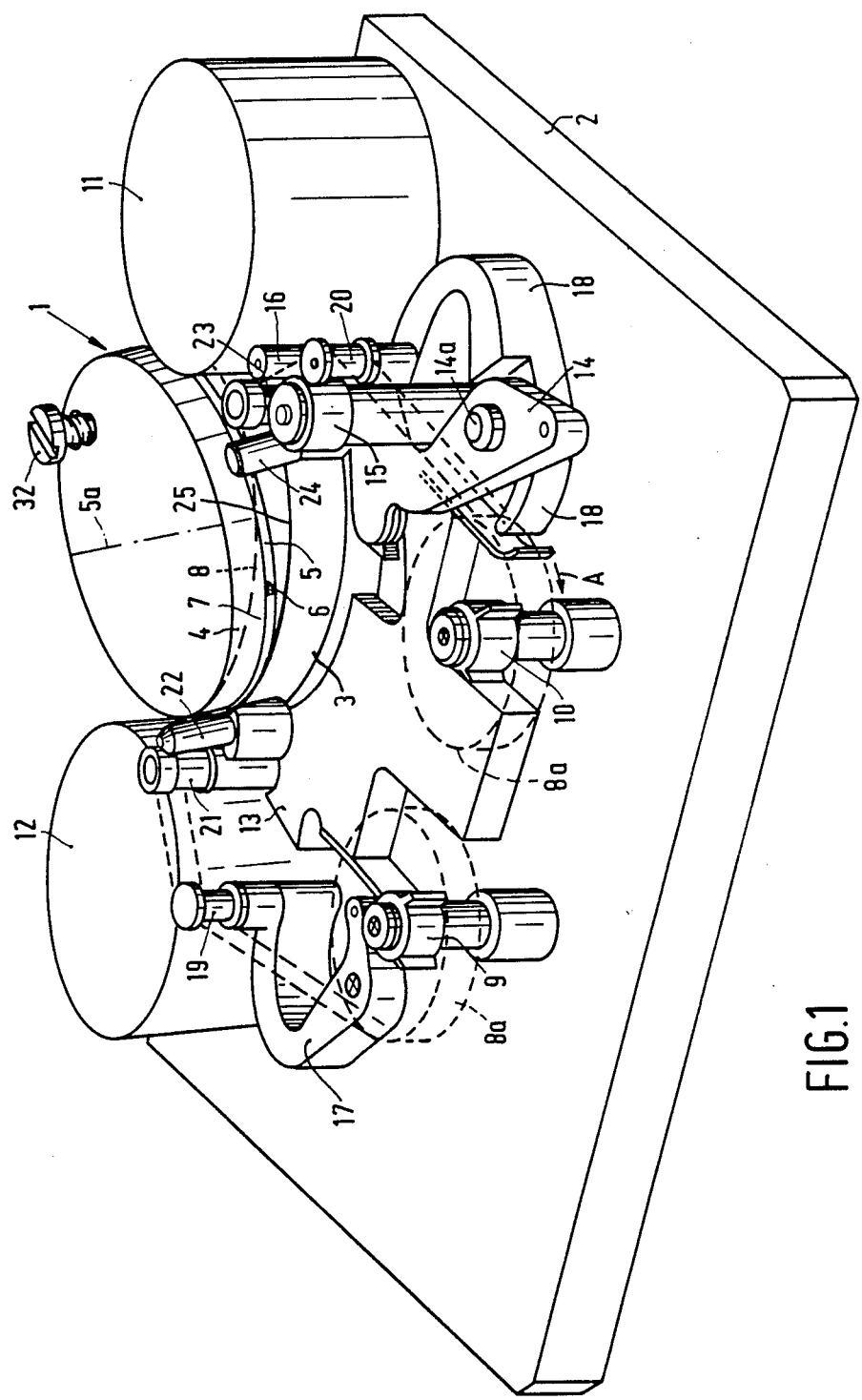
FIG. 1 is a perspective plan view of a magnetic-tape apparatus in accordance with the invention.
Figure 2:
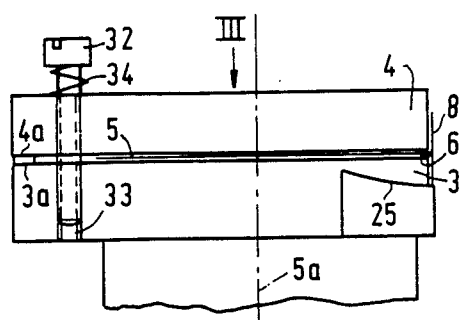
FIG. 2 is a side view to a different scale of the scanning unit of the magnetic-tape apparatus shown in FIG. 1.
Figure 4:
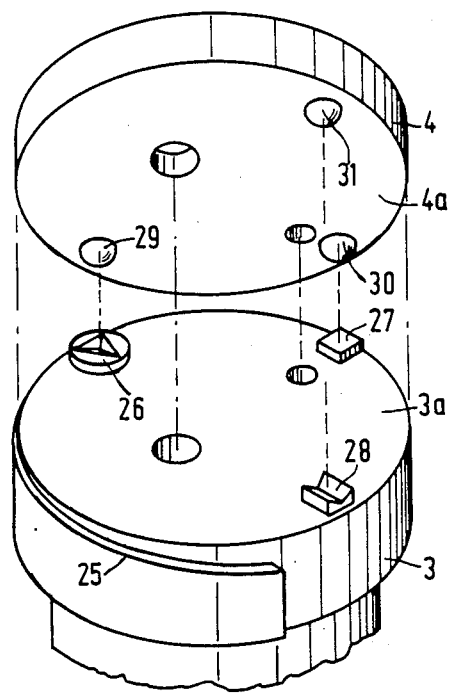
FIG. 4 is an exploded view of the lower and the upper drum and the positioning elements arranged thereon.

The magnetic-tape apparatus shown in FIG. 1 comprises a scanning unit 1 mounted on a frame 2 comprising a flat deck plate. The scanning unit 1 is shown to an enlarged scaled in FIGS. 2 to 4. The scanning unit comprises a drum-shaped guide means comprising two stationary drums 3 and 4, the drum 3 being mounted on the frame 2, this constituting the lower drum and the upper drum 4 being mounted on the lower drum 3 in a manner to be described hereinafter. A head support 5 carrying a plurality of magnetic heads 6, for example four heads, is mounted for rotation between the lower drum and the upper drum. Together the lower drum and the upper drum form a curved guide surface 7 having a circularly cylindrical shape with a cylinder axis which at least substantially coincides with the axis of rotation 5a of the head support 5. Tape Drive and Handling Mechanism During operation of the apparatus the surface 7 guides a magnetic tape 8 which, as is shown schematically in FIG. 1, is wound on tape reels 8a and 8b and which during normal operation is moved from the reel 8a to the reel 8b in the direction indicated by the arrow A. For this purpose the apparatus comprises winding spindles 9 and 10 which are driven, in a manner not shown, from the underside of the frame to provide the tape transport. Driving is effected by means of an electric motor 11 which, viewed in FIG. 1, is situated to the right of the scanning unit 1. The head support 5 is driven by means of an electric motor 12 which is situated to the left of the scanning unit. Alternatively, in a manner not shown, the drive of the head support 5 may be integrated in the scanning unit 1, in which case the drive is situated near the underside of the lower drum 3.

On the upper side of the frame 2 a sliding plate 13 is arranged to be rectilinearly slidable in a direction perpendicular to a line interconnecting the axes of rotation of the winding spindles 9 and 10. Further, a pressure-roller lever 14 is arranged on the upper side of the frame 2 so as to be pivotable about a pivoting spindle 14a. The pressure-roller lever carries a pressure roller 15 which, in the operating position as shown in FIG. 1, is positioned against the capstan 16 as a result of the pivotal movement of the pressure-roller lever 14. In the operating position the capstan 16 is driven by the electric motor 11 in a manner not shown, and in cooperation with the pressure roller 15 ensures that the magnetic tape 8 is moved over the guide surface 7 with a constant velocity.

The sliding plate 13 controls two levers 17 and 18 which carry guide pins 19 and 20 respectively. The magnetic tape is guided over these pins from the reel 8a to the reel 8b. The sliding plate 13 further carries two pairs of tape guides 21, 22 and 23, 24 respectively. Each pair of tape guides may be formed as an integral unit from one piece of plastic. The tape guides 21 and 23 extend perpendicularly to the frame 2 and the tape guides 22 and 24 are inclined. Since the axis of rotation 5a is inclined relative to the frame 2 and the tape guides 22 and 24 are also inclined, the tape can be guided along a helical path over the guide surface 7 of the drum during operation, the tape being guided over the larger part of its width by the upper drum 4 at the side of the tape guide 22 and the tape being guided over the larger part of its width by the lower drum 3 at the side of the tape guide 24.

In order to ensure a correct guidance of the tape in its width direction the lower drum 3 further comprises a guide face 25. Thus, during the movement over the guide surface 7 the tape performs an accurately predetermined movement so that during rotation the head 6 writes or reads tracks on the magnetic tape 8 which are inclined relative to the longitudinal axis of tapers. For a further description of the parts of the apparatus, such as the sliding plate 13 and the movement of this plate to the various operating positions reference is made to Netherlands Patent Application No. 85.01027 filed on Apr. 9, 1985, to which U.S. patent application Ser. No. 06/793887 corresponds (herewith incorporated by reference).

First Embodiment Scanning Unit

It is important that the lower drum 3 and the upper drum 4 are positioned correctly relative to one another after assembly of the scanning unit 1. For this purpose the facing axial end walls of the lower drum and the upper drum comprise sectors which constitute wall portions 3a and 4a respectively, each carrying three positioning elements, namely the positioning elements 26, 27 and 28 on the wall portion 3a and the positioning elements 28, 30 and 31 on the wall portion 4a. In the assembled condition of the scanning unit 1 the positioning elements 26 and 29, 27 and 30 and 28 and 31 pairwise engage with one another. The positioning elements 29, 30 and 31 are semispherical and the positioning element 27 is formed with a wall which extends parallel to a plane perpendicular to the axis of rotation 5a. The positioning element 26 takes the form of a recess whose three walls form a tetrahedron. The positioning element 28 has two walls arranged as a prism. Together the three pairs of positioning elements 26 and 29, 28 and 31 and 27 and 30 which interengage after assembly ensure that the lower drum and the upper drum are in an entirely statically defined position relative to one another.

Figure 3:
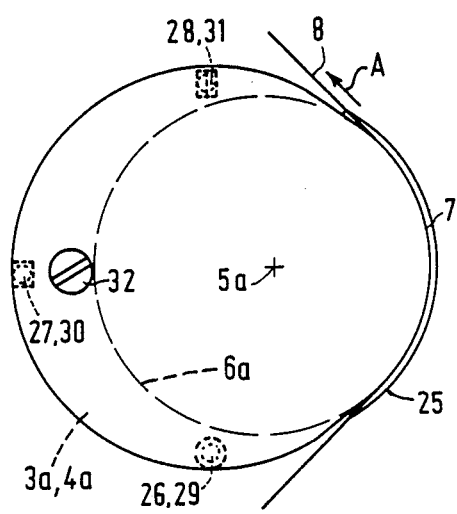
FIG. 3 is a plan view of the scanning unit in accordance with the arrow III in FIG. 2.

Preferably, the positioning elements are integrated with the associated lower drum and upper drum respectively. As can be seen in FIG. 3, the positioning elements and the wall portions are situated outside the path 6a described by the heads 6. For this purpose the facing axial end walls extend from the area where they adjoin the guide surface 7 to a point outside the circular path 6a described by the free ends of the magnetic heads 6. The lower drum and the upper drum are interconnected by a fixing means comprising only one bolt 32. The bolt 32 is fitted into a hole in the upper drum 4 whose central axis extends parallel to the axis of rotation 5a. This central axis coincides with that of a bore in the lower drum 3, whose bore wall is formed with screwthread, so that the bolt 32 can be screwed into the lower drum. A spring 34 is arranged between the upper axial end wall of the upper drum 4, so that the head of the bolt 32 and when the bolt 32 is tightened the spring exerts an elastic pressure on the lower drum and the upper drum at the location of the positioning elements. In this respect it is advantageous that, viewed parallel to the axis of rotation 5a, the bolt 32 is situated diametrically relative to the center of the guide surface 7 and within a triangle whose vertices are constituted by the positioning elements. In this way a correct and uniform pressure is exerted on the pairs of positioning elements.

The entirely statically defined positioning of the lower drum and the upper drum relative to one another by means of three pairs of positioning elements in accordance with the invention enables the scanning unit to be manufactured accurately yet easily. First of all, the lower drum 3 and the upper drum 4 are manufactured separately, the positioning elements 26 to 28 and 29 to 31 being formed simultaneously on the wall portions 3a and 4a respectively. Subsequently, the lower drum and the upper drum are assembled by interengagement of the positioning elements on the drums, after which the lower and upper drum assembly is clamped in a lathe, which is preferably of a numerically controlled hydrostatic type. During machining by means of such a lathe, preferably turning off by means of a cutting tool, it is possible to control this tool both in the radial and the axial direction relative to the axis of rotation 5a. During the controlled movement of the cutting tool, which results in the side of the guide surface 7 being turned off, both this surface and the guide face 25 are formed. After removal from the lathe the upper drum and the lower drum are separated and the head support 5, already provided with the heads 6, is mounted between the lower and the upper drum. Assembly of the scanning unit 1 is completed after re-assembly of the lower and the upper drum, positioning by means of the positioning elements, and securing by means of the bolt 32.

As a result of the location of the positioning elements outside the circular path 6a described by the heads 6 the angle through which the guide surface 7 can guide the tape 8 is limited to approximately 200°. In this embodiment the scanning unit 1 is intended for reading or writing tracks with digitally encoded audio signals, the angle through which the magnetic tape 8 is wrapped over the guide surface 7 being at least substantially 90°. Therefore the construction of the magnetic-tape apparatus comprising the scanning unit in accordance with the invention is particularly suitable for use in such a magnetic-tape apparatus, but from the foregoing it will be evident that this construction can also be employed in the case of wrapping angles larger than 90°.

Thus, for the manufacture of the scanning unit 1 drums 3 and 4 may be used which initially need not be manufactured very accurately, because after turning off in a lathe and mounting of the head support 5 the drums 3 and 4 are positioned in an unambiguously defined relationship to each other, in such a way that no or substantially no tolerance exists between the radii of the lower and the upper drum at the location of the guide surface 7. The only residual tolerance is caused by a difference in the radial protrusion of the heads 6 on the head disc 5.

During rotation of the drums an air film is formed between the magnetic tape 8 and the guide surface 7. An advantage of the construction in accordance with the invention is that, reckoned in the width direction of the tape, the air film has a uniform thickness at the lower drum and the upper drum. This results in a very effective air-film guidance of the tape at the location of the guide surface, which is also advantageous for a correct and uniform tape transport. Since this air film is uniform in the width direction of the tape the tolerances on the radial distances of the individual heads 6 from an axis of rotation 5a may be slightly larger in comparison with conventional constructions, without giving rise to problems. Further it is possible by optimising the shape of the guide surface 7 to arrange the magnetic heads 6 near that part of the circumference of the guide surface where the tape 8 enters, in such a way that the radial protrusion relative to the guide surface is slightly larger than at the location where the tape leaves the guide surface. At the location where the guide surface begins the thickness of the air film is generally larger than at the end of the guide surface.

The correct positioning of the drums in the construction in accordance with the invention enables the tolerance on the distance between the facing axial end walls of the drums 3 and 4 and the height of the gap between the two axial end walls in which the head support 5 rotates to be reduced. This results in a very small interruption in the guide surface 7 at the location of the gap. A further advantage is that in the case of future replacement of the head support 5, for example owing to wear of the heads 6, disassembly and subsequent re-assembly can be effected simply. This simplified and speeds up such a replacement, which is advantageous in view of servicing.

The use of a lathe, in which the cutting tool can be controlled both in the axial and the radial direction during turning off of the assembled drums 3 and 4 also enables the guide edge 25 at the lower side of the guide surface 7 to be formed accurately. It is advantageous that the circumferential surface of the drum need be turned off by the cutting tool only at the location of the guide surface 7. This is effected by radial control of the cutting tool, so that machining is effected only at the location of the guide surface 7 and the cutting tool moves freely past the remainder of the circumferential surface of the drums.

Other Embodiments

Figure 5:
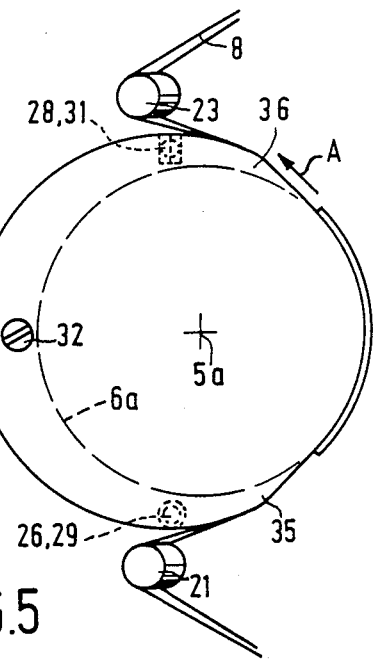
FIG. 5 is a plan view of the scanning unit of a magnetic-tape apparatus in a second embodiment in accordance with the arrow III in FIG. 2, the scanning unit being provided with two tape guides.

As is shown in FIG. 5, the construction in accordance with the invention enables a tape guide 35 and 36 to be formed simultaneously with the manufacture of the lower and upper drum respectively. These tape guides replace the inclined tape guides 22 and 24 in FIG. 1. Forming such a tape guide on the circumferential ends of the guide surface 7 is possible owing to the method of controlling the cutting tool in the axial and the radial direction during turning off. When such a tape guide is used the tape can leave the scanning unit after the guide 36 at the same level relative to the frame 2 at which the tape enters the scanning unit at the location of the tape guide 35. In this way all the guide means which must be positioned accurately are concentrated in the scanning unit 1. All the other tape guides of the magnetic-tape apparatus can be arranged in such a way that their lower end surfaces are situated at the same level relative to the frame 2, which results in a simple mounting of these tape guides.

The drums 3 and 4 may be made of a metal, the positioning elements 26–31 being mounted on the end walls. Alternatively, the drums can be manufactured advantageously from a plastic material, the positioning elements 26 to 31 being formed simultaneously by injection molding. In this way it is also possible to achieve an accurate mutual positioning of those parts of the drums 3 and 4 which cooperate with the tape. Alternatively, the drums may be die cast from aluminum.

Figure 6:
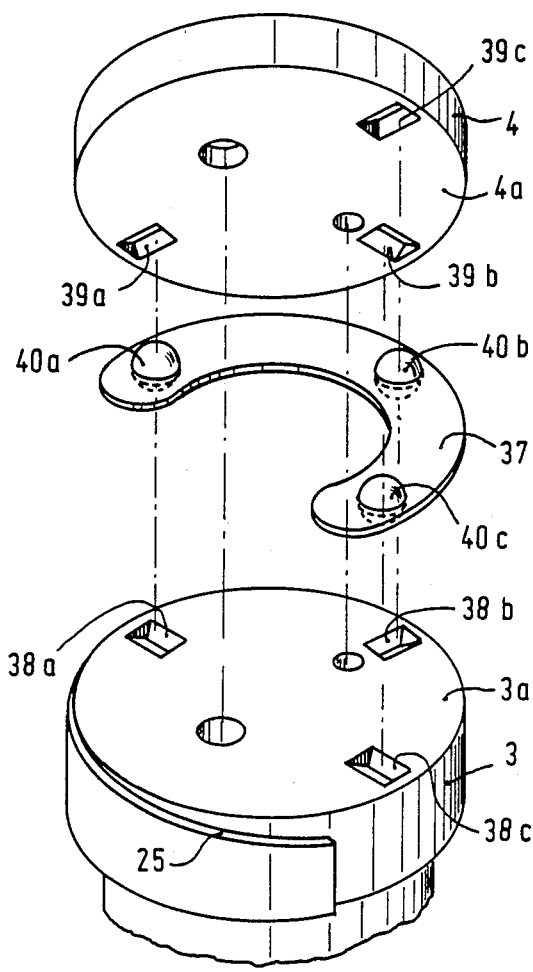
FIG. 6 is an exploded view, similar to FIG. 4, of the scanning unit of a magnetic-tape apparatus in a third embodiment.

As is shown in FIG. 6, the lower drum 3 and the upper drum 4 may also be positioned by means of an intermediate element constituted by a disc 37 which in the assembled condition is situated between the axial wall portions 3a and 4a and outside the circular path 6a described by the magnetic heads 6. In the wall portions 3a and 4a positioning elements are formed comprising prismatic recesses 38a, 38b, 38c and 39a, 39b, 39c respectively, the longitudinal axes of the recesses 38a, 38c and 39a, 39c being coincident and the longitudinal axes of the recesses 38b and 39b extending perpendicularly to the longitudinal axes of the recesses 38a, 38c and 39a, 39c respectively. The disc 37 carries three positioning elements constituted by balls 40a, 40b, 40c which are clamped in the disc 37 and which project from the lower and upper wall portions of the disc 37. In the assembled condition the bolt 32 urges the balls 40a, 40b, 40c against the walls of the recesses in the wall portions 3a and 4a. This also results in an entirely statically defined three-point connection of the two drums. An additional advantage of the use of the intermediate element 37 is that the height of the gap between the drums 3 and 4 in which the heads 6 rotate is adjustable by a suitable choice of the diameters of the balls 40.

What is claimed is:

1. A magnetic-tape apparatus comprising a frame, a scanning unit mounted on the frame, and means for transporting a length of magnetic tape past said scanning unit for scanning of the length of tape by the unit,
    said scanning unit comprising a rotatable head support mounted for rotation about an axis, and at least one magnetic head mounted on said support and having a free end; guide means comprising an upper drum and a lower drum, disposed in a fixed position on said frame, said head support being mounted between said drums for rotation; positioning elements for positioning the upper drum and lower drum in alignment relative to one another; and fixing means for interconnecting the upper drum and the lower drum,
    said drums having outer circumferential surfaces which together form a curved guide surface having a circularly cylindrical shape about a cylinder axis which is at least substantially coaxial with the axis of rotation of said head support, disposed near the circular path of said at least one head, said curved guide surface extending over a first angularly extending part of said outer circumferential surfaces, and said tape being guided over said guide surface,
    characterized in that said upper drum and lower drum have respective facing axial end walls, each end wall having a sector in which a wall portion is formed, each wall portion carrying three positioning elements only, said positioning elements of each respective drum defining vertices of a triangle; said axially facing wall portions adjoin a second part of said outer circumferential surfaces diametrically opposite said first part, and extend radially beyond a circular path described by the free end of said at least one magnetic head, said sectors in which said wall portions are formed, and said positioning elements, are disposed radially beyond said circular path; and the positioning elements of one wall portion and those of the other wall portion cooperate pairwise with one another to establish together a statically defined alignment between the upper drum and the lower drum, and
    said fixing means comprises an element pressing against at least one of said drums at a location within said triangle, for biasing said positioning elements pairwise against one another.

2. An apparatus as claimed in claim 1, characterized in that said positioning elements are integral with the respective upper and lower drums.

3. An apparatus as claimed in claim 2, characterized in that said positioning elements are formed as recesses in one of said drums, and protrusions on the axial end walls of the other of said drums, respectively.

4. An apparatus as claimed in claim 1, characterized in that said fixing means comprises one bolt connection only; said bolt connection, viewed parallel to the axis of rotation, lying outside said circular path and within said triangle whose vertices are defined by the positioning elements, and being arranged at least substantially diametrically opposite the center of the guide surface.

5. A method of manufacturing a scanning unit comprising a rotatable head support and at least one magnetic head mounted on said support for movement along a circular path, and a guide means comprising an upper drum and a lower drum between which said head support is mounted for rotation, and fixing means for securing said upper drum to said lower drum, said drums having circumferential outer surfaces which together form a curved guide surface situated near the circular path of said magnetic head, comprising
    separately manufacturing an upper drum and a lower drum, each drum having a respective axial end wall and three only positioning elements formed in the respective drum near its axial end wall,
    assembling said upper drum and lower drum together, aligned relative to each other by said positioning elements, and clamping said drums together,
    machining, at least locally, circumferential surfaces of said assembled upper and lower drums together, to form said guide surface,
    separating said upper and lower drum from each other, and mounting the head support for rotation with respect to one of said drums,
    reassembling said upper and lower drum to each other, aligned relative to each other by said positioning elements, with the head support disposed between said drums, and
    securing said drums together by said fixing means.

6. A method as claimed in claim 5, characterized by using a tool, for machining said drum surfaces together, which is controlled both in radial and axial directions.

7. A method as claimed in claim 6, characterized in that said tool is controlled to form a guide face on one of said drums for guiding a lateral edge of a magnetic tape when said tape is being transported past the magnetic head for scanning.

8. A method as claimed in claim 5, characterized in that at least one tape guide is formed by said controlled movement in the axial and radial directions.

* * * * *